Dec. 24, 1957     G. B. GUTHRIE, JR     2,817,836
DIRECTIONAL INTERROGATOR FOR AN IDENTIFICATION
OF FRIEND OR FOE SYSTEM
Filed Feb. 11, 1946
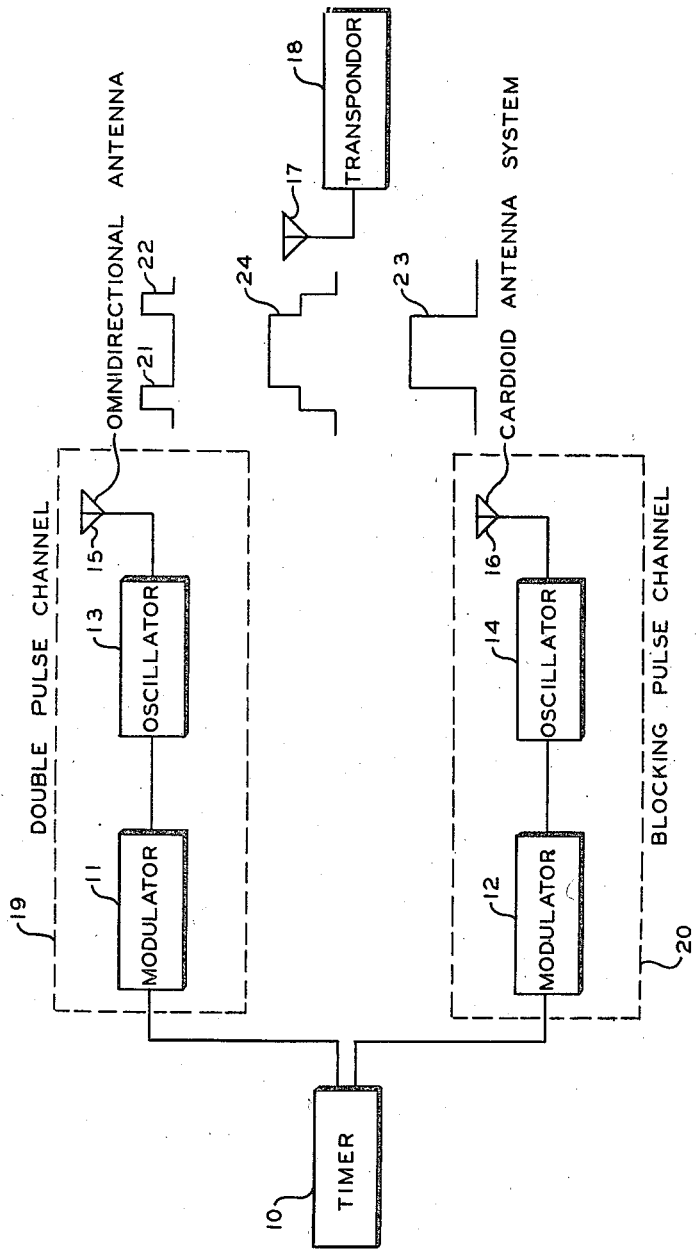
INVENTOR
GEORGE B. GUTHRIE JR.
BY
ATTORNEY United States Patent Office
2,817,836
Patented Dec. 24, 1957

2,817,836

DIRECTIONAL INTERROGATOR FOR AN IDENTIFICATION OF FRIEND OR FOE SYSTEM

George B. Guthrie, Jr., Portland, Oreg., assignor, by mesne assignments, to the United States of America as represented by the Secretary of the Navy Application February 11, 1946, Serial No. 646,919

1 Claim. (Cl. 343—101)

This invention relates to communication systems, and more particularly those used for purposes of identification.

Pulse-echo systems are highly successful in determining the direction and range or targets, but do not indicate directly whether a target is friendly or hostile. In military operations, where the ability to distinguish friend from foe is vital, apparatus for challenging and classifying objects is required.

Commonly used identification methods permit the target to be challenged or interrogated by means of radar. A small identifying unit, called a transpondor receives the interrogating pulse, and causes it to trigger a transmitter, which returns a pulse reply directly to the challenging set. If this reply—which is observed on a cathode-ray tube—conforms with a predetermined code, the target is friendly. Otherwise, it is assumed to be hostile and appropriate action is taken.

It is possible for hostile forces to utilize the automatic response characteristics of a transpondor to locate the ship or plane carrying this identifying unit. It has been found advantageous, therefore, to use transpondors which are responsive only to a predetermined type of interrogation. Thus, identification signals will be transmitted in reply to only those interrogators with the proper interrogating transmission.

A control circuit, which can be incorporated in a transpondor to make it responsive only to interrogating pulses having predetermined characteristics, is described in the copending application of Leon Bess, Serial No. 588,993, filed April 18, 1945, entitled "Electrical Circuit," now U. S. Patent No. 2,580,213 issued December 25, 1951. The receiving component of the transpondor, which may be a super-regenerative receiver, receives, detects, and amplifies the pulses transmitted by an interrogator and supplies these pulses in video form to the above-mentioned control circuit. This circuit is responsive only to paired video pulses which are separated by the proper time interval, and generates a control signal which actuates or keys the transmitting component of the transpondor. The control circuit does not respond when hit by the two properly spaced pulses plus a third pulse spaced between the two.

In addition to having a coded interrogation, it is also highly desirable that the interrogation be directional. If the interrogation is omnidirectional, one identifying reply could cover for several objects at the same range from the interrogator. Pulse-echo systems achieve directional transmission and reception by using a beam-forming antenna. Since identification units ordinarily operate at a relatively low frequency, however, it is impractical to use an antenna that is large enough to be directional.

It is, therefore, the object of the present invention to provide apparatus for directional interrogation.

It is a further object to provide apparatus for coded, directional interrogation of a transpondor which is triggered solely by coded pulses.

These and other objects will be more apparent upon consideration of the following specification, taken with the accompanying drawing, the single figure of which illustrates an embodiment of the present invention.

Briefly, the output of oscillator 13 consists of radio frequency pulses so coded as to trigger transpondor 18, these pulses being radiated omnidirectionally. The output of oscillator 14 consists of a radio frequency pulse spaced between the code pulses, and radiated omnidirectionally except for a narrow null sector. Transpondor 18 is effectively blocked unless its position coincides with the null sector in the radiation pattern of antenna 16.

More specifically, timer 10, which may consist of a series of conventional multivibrators, provides a first and a second timing impulse, labeled 21 and 22, having a predetermined spacing, and a third timing impulse 23 spaced between the first and second impulses. The width and spacing of these impulses will be determined by the control circuit used in the transpondor. These first and second impulses follow a channel herein termed "double pulse channel" shown in dotted rectangle 19, the third impulse following a channel termed "blocking pulse channel" shown in dotted rectangle 20. The first and second timing impulses each trigger modulator 11, the output of which fires oscillator 13. The output of oscillator 13 consists of two radio frequency pulses, so spaced that when they are received by transpondor 18, after being radiated omnidirectionally by antenna 15, the aforementioned control circuit in the transpondor will key its transmitter and reply to the interrogation. The third timing impulse triggers modulator 12, the output of which fires oscillator 14. The output of oscillator 14 is a radio frequency pulse, spaced between the first and second radio frequency pulses, and having a time duration approximately equal to the spacing between these pulses. This third pulse is radiated by an antenna system 16 having a characteristic such that this pulse, which blocks the operation of transpondor 18, is radiated over 360° of azimuth except for a narrow null sector. Accordingly, transpondor 18 will receive all three pulses if it is located anywhere except within said narrow sector of azimuth. Since more power is radiated from "blocking pulse channel" 20 than from "double pulse channel" 19, superposition of the three pulses at antenna 17 of transpondor 18 results effectively in a single pulse 24 to which transpondor 18 will not respond. If, however, transpondor 18 is located within this narrow null sector, it will receive only the coded interrogation and will respond normally.

It will be obvious to one skilled in the art that part or all of the functional parts of the double pulse channel 19 and the blocking pulse channel 20 may be combined without changing the overall operation. For instance, the antennas may be so designed that one of the radiating elements is common to both antenna systems. Better directivity is obtained by feeding less power to the omnidirectional antenna 15 than is fed to antenna 16 which has the null in its pattern, since this results in operating at the narrower portion of the null sector.

Though the present invention has been described as embodied in an identification system, it is obviously not restricted to such use. Changes may be made in the circuit herein utilized without departing from the invention, as sought to be defined in the following claim.

What is claimed is:

In combination, means for transmitting in an omnidirectional radiation pattern from a first location a coded pulse train consisting of a first and a second equal amplitude pulse, said pulses having predetermined time durations and a selected time separation, means for transmitting from said second location in a cardioid radiation pattern a third pulse during the time interval between said first and second pulses, said third pulses having a time duration equal to the time separation between said first and second pulses and an amplitude greater than that of said first and second pulses whereby said first, second and third pulses so transmitted combine to form effectively a single extended stepped pulse in the area wherein said radiation patterns overlap and whereby said first coded pulse train occurs only in that area exclusively occupied by said omnidirectional radiation pattern.

References Cited in the file of this patent

UNITED STATES PATENTS

| | | |
|---|---|---|
| 2,212,238 | Kolster | Aug. 20, 1940 |
| 2,279,031 | Cockerell et al. | Apr. 7, 1942 |
| 2,279,466 | Johnske et al. | Apr. 14, 1942 |
| 2,415,359 | Loughlin | Feb. 4, 1947 |
| 2,419,525 | Alford | Apr. 29, 1947 |
| 2,424,079 | Dome | July 15, 1947 |

FOREIGN PATENTS

| | | |
|---|---|---|
| 705,481 | Germany | Apr. 29, 1941 |